(12) United States Patent
Amos

(10) Patent No.: US 6,934,870 B1
(45) Date of Patent: Aug. 23, 2005

(54) CLOCK MANAGEMENT SCHEME FOR PCI AND CARDBUS CARDS FOR POWER REDUCTION

(75) Inventor: James A. Amos, North Canton, OH (US)

(73) Assignee: Cisco Technology, Inc., San Jose, CA (US)

( * ) Notice: Subject to any disclaimer, the term of this patent is extended or adjusted under 35 U.S.C. 154(b) by 646 days.

(21) Appl. No.: 10/080,304

(22) Filed: Feb. 21, 2002

(51) Int. Cl.$^7$ .............................. G06F 1/04; G06F 1/26
(52) U.S. Cl. ..................... 713/501; 713/300; 713/320; 713/324; 713/600
(58) Field of Search ...................... 713/1–100, 300–601

(56) References Cited

U.S. PATENT DOCUMENTS

| | | | | |
|---|---|---|---|---|
| 5,390,293 A | * | 2/1995 | Nishioka et al. | 345/593 |
| 5,692,202 A | * | 11/1997 | Kardach et al. | 713/324 |
| 6,002,918 A | | 12/1999 | Heiman et al. | |
| 6,141,762 A | * | 10/2000 | Nicol et al. | 713/300 |
| 6,259,326 B1 | * | 7/2001 | Dunlop et al. | 331/2 |
| 6,535,798 B1 | * | 3/2003 | Bhatia et al. | 700/293 |
| 6,760,857 B1 | * | 7/2004 | Lau et al. | 713/500 |
| 6,763,471 B1 | * | 7/2004 | Aoyama | 713/320 |
| 6,782,485 B2 | * | 8/2004 | Takai | 713/500 |

* cited by examiner

*Primary Examiner*—Lynne H. Browne
*Assistant Examiner*—Anand B. Patel
(74) *Attorney, Agent, or Firm*—Tucker Ellis & West LLP

(57) ABSTRACT

A clock management scheme for an 802.11 MAC on a PCI or Cardbus bus that works in conjunction with industry standardized power mechanisms. The scheme involves enabling and disabling the main clock in coordination with IEEE 802.11 protocols and is compatible with ACPI power management and configuration interface specification. When the main clock is disabled the MAC and supporting hardware can run off either a lower frequency oscillator or the bus clock. The bus clock is automatically used when it is required by accesses by the host to the card.

20 Claims, 3 Drawing Sheets

CLOCK MANAGEMENT SCHEME FOR PCI AND CARDBUS CARDS FOR POWER REDUCTION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A "MICROFICHE APPENDIX."

Not applicable.

BACKGROUND OF THE INVENTION

1. Field of the Invention

The present invention is directed to a system and method for saving power, and more specifically to a method and system for use with IEEE 802.11 compliant Media Access Controller (MAC) circuitry that enables and disables the main clock in coordination with 802.11 protocols and is also compliant with the Advanced Configuration and Power Interface (ACPI) power management and configuration interface specification.

2. Description of the Related Art Including Information Disclosed Under 37 CFR 1.97 and 37 CFR 1.98.

Increasingly, electronic circuit manufacturers need to reduce the power consumption of their boards. The conservation of power is particularly important in portable electronic devices, such as wireless networking adapters or wireless phones where the product is specifically designed for use in situations where power outlets are not available. Wireless products usually must operate using internal batteries or rechargeable battery packs for extended periods of time, thus the conservation of battery power becomes a primary concern.

802.11 WLAN cards are often implemented as PCI and Cardbus cards. The MAC is required to be responsive to the host bus interface (PCI Bus) and events from a wireless or RF interface. The RF interface often utilizes IEEE 802.11 power management whereas the PCI Bus interface utilizes ACPI power management. Typically, a sleep timer is used to save power. The MAC goes into a sleep mode and the host processor can bring the MAC out of sleep by accessing the Card Information Structure (CIS) table and accessing certain host interface registers such as the command register. Once awakened, the MAC may decide that an action is required in response to the host interface wakeup or it may decide to resume its sleep mode. However, a clock is required to access and retrieve data from the CIS table, PCI configuration space and VPD data, and to issue commands to the MAC. Thus operating in a power save mode wherein the clock is disabled in sleep mode is problematic.

The IEEE 802.11 protocol specifies a procedure for mobile nodes to operate in a power saving mode. The mobile node may be in one of two states, awake and able to receive frames at any time, or power save (PS) wherein the mobile node is unable to transmit or receive and consumes very low power. The mobile node operating in power save mode is required to periodically return to an awake state to listen for traffic indication map (TIM) beacons which identify the mobile units for which traffic is pending and buffered at the AP. In addition, the TIM contains an indication whether broadcast/multicast traffic is pending. If the TIM beacon indicates traffic is pending for the mobile unit, the mobile unit must then stay awake until it has handled all its traffic and can then return to PS mode. Otherwise, if the TIM indicates that there is no traffic for the mobile node, the mobile node can immediately return to PS mode.

Finally, the Mini PCI and Cardbus specifications contain a mechanism that allows an opportunistic disabling of the PCI clock. When the PCI clock is active, it forces all devices on the bus segment to clock and use power. The PCI CLKRUN# mechanism allows a device to indicate to the bus that it will allow the clock to be disabled.

Thus the need exists for a method and system for use by a MAC for power management that is compatible with both IEEE 802.11 standards and the ACPI specification.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of instrumentalities and combinations particularly pointed out in the appended claims.

BRIEF SUMMARY OF THE INVENTION

In view of the aforementioned needs, the invention contemplates a clock management system and method that is compatible with standardized mechanisms. The basic mechanism involves enabling and disabling the main clock in coordination with 802.11 protocols and is complaint with the ACPI specification. One aspect of the invention is that the controller operates at the minimum required clock speed whenever possible. Another aspect of the present invention is that when the controller operating at lower clock speeds, higher frequency oscillators are powered off, thus realizing an additional power savings.

In one embodiment, a clock selection means, typically a multiplexer, receives inputs from a high frequency oscillator, a low frequency oscillator and a bus clock. The controller selects the appropriate clock signal from the selection means. The controller normally operates in an active, or awake, mode and an inactive, or sleep mode. When in active mode, the selection means selects the high frequency oscillator. When in sleep mode, the controller causes the selection means to select the low frequency oscillator and then shuts off the high frequency oscillator. If the bus has activity for the controller, a wakeup signal is sent from the bus interface to the controller. The controller then causes the selection means to select the bus clock and processes the bus activity. Once the controller has processed the bus activity, the controller returns to sleep mode by having the selection means switch to the low frequency oscillator. When exiting sleep mode, the controller first enables the high frequency oscillator and once the oscillator has achieved normal operating parameters, instructs the selection means to select the high frequency oscillator. After completing any processes that are required to be handled while in active mode, the controller then switches either to the low frequency oscillator or the bus, depending on whether there is pending bus traffic. It should be noted that if the controller has to spend substantial amounts of time operating in the active mode, a second enable/disable signal may be utilized to power the low frequency oscillator on and off, thus realizing additional power savings.

In another embodiment, an 802.11 compliant MAC is utilized as the controller which can operate in a plurality of modes, including an active mode or a sleep mode. When in active mode, the MAC utilizes a high frequency clock. When in sleep mode, the MAC utilizes a low frequency clock. The MAC is also able to utilize a bus clock such as a PCI or Cardbus clock to process data from a card bus. A selection means such as a multiplexer is used to select between the high frequency clock, low frequency clock and bus clock. The MAC provides a control signal to the selection means for selecting the appropriate clock. Upon entering sleep mode, the controller signals the selection means to select the low frequency clock and signals the high speed oscillator to turns itself off and sets a timer in order wake up and handle any 802.11 transactions. If while in sleep mode the bus interface indicates it has a transaction for the MAC, the bus interface signals the MAC via a bus wakeup. The MAC then causes the selection means to switch to the bus clock and handles the bus activity. Upon completion of the bus activity, if the timer has expired the MAC enables the high frequency oscillator to power on and after waiting a brief interval for the oscillator to reach normal operating conditions, directs the clock selection means to select the high frequency oscillator, otherwise, the MAC directs the selection means to switch to the low frequency clock and returns to sleep mode until either the timer expires or additional bus activity is required. When the timer expires, the MAC then enables the high frequency oscillator and after waiting an appropriate interval for the high frequency oscillator to achieve normal operation, instructs the selection means to switch to the high frequency oscillator. Thus, the present invention attempts to minimize power consumption by having the MAC operate at the lowest necessary clock speed at all times.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

BRIEF DESCRIPTION OF THE SEVERAL VIEWS OF THE DRAWING

The drawings illustrate the best mode presently contemplated of carrying out the invention.

This the drawings.

DETAILED DESCRIPTION OF INVENTION

The present invention is for a clock management scheme that is particularly useful for use with an 802.11 MAC on PCI or Cardbus cards for power reduction. The MAC circuitry works in conjunction with industry standardized power savings mechanisms such as well as with standard 802.11 power saving protocols.

Figure 1:
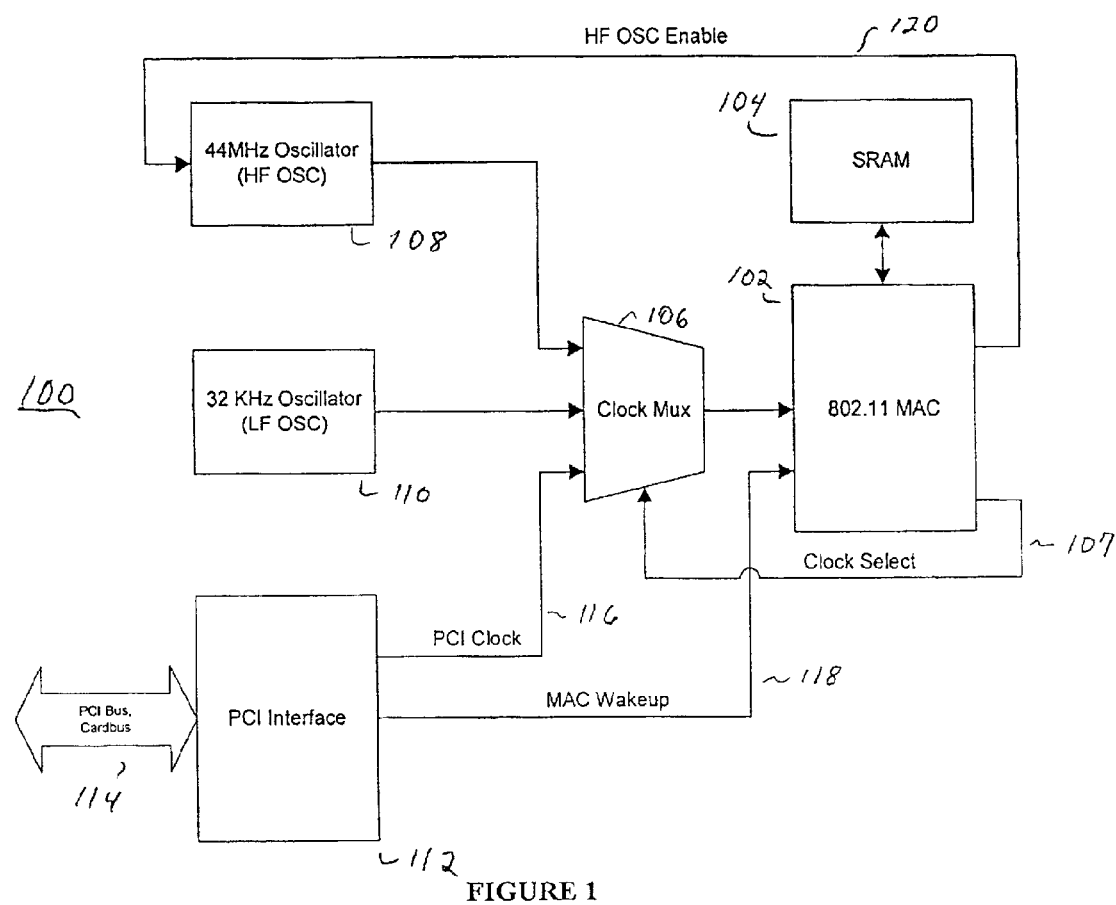
FIG. 1 is a block diagram for a system for implementing the present invention.

Referring to FIG. 1 there is shown a block diagram of the system of the present invention generally designated 100. An 802.11 MAC 102 with SRAM 104 is shown. Typically, the MAC 102 will also have RAM, ROM and a wireless interface (now shown). Card information data (CIS) is normally stored in the SRAM 104. The MAC 102 receives its clocking signal from a clock multiplexer 106. A clock select line 107 from the MAC 102 is use to select one of the inputs to the multiplexer 106.

The clock multiplexer has three inputs. The first input is from a high frequency oscillator 108. The second input to the multiplexer 106 is from a low frequency oscillator 110. Finally, the third input to the multiplexer 106 is received from the PCI interface 112. The PCI interface 112 is utilized to exchange data with the PCI bus (or Cardbus) 114. A signal sent on the MAC Wakeup line 118 notifies the MAC 102 when there is bus activity.

One aspect contemplated by the present invention is that the high frequency oscillator 108 may be shut off when it is not being used by the MAC 102. An enable line 120 connecting the MAC 102 to the high frequency oscillator 108 allows the MAC to power on and power off the high frequency oscillator 108. In cases where it is contemplated that the low frequency oscillator 110 will not be used for long periods of time, an enable line similar to 120 may also be connected to the low frequency oscillator 110 in order to power it on and off for additional power savings.

The hardware mechanism of the present invention allows the main clock (high frequency oscillator) 108 to be disabled and enabled in a opportunistic fashion to save power. When the high frequency oscillator 108 is disabled, the MAC 102 and supporting hardware can be run off either the low frequency oscillator 110 (typically 32 kHZ or 50 KHz) or the PCI bus clock 116. The PCI bus clock is automatically used when it is required for accesses by the host 102 to the card (not shown).

The basic mechanism in an 802.11 network for power savings is the Traffic Indication Map (TIM) beacon packet. The TIM beacon packets are sent periodically and contain information identifying which devices on the network have pending traffic that is buffered by the Access Point (AP). If the TIM beacon indicates there is no traffic for the MAC 102 or that all of the MAC 102 traffic is completed, the MAC can sleep until the next TIM beacon.

When entering sleep mode, the MAC 102 would set a timer and wake up after the timer expires. A host processor (not shown) can bring the MAC 102 out of sleep mode by accessing the CIS table, and accessing certain host interface registers such as the command register. The MAC 102 may then decide that an activity is required in response to the host interface wake up or it may decide to return to sleep mode.

However, accessing the CIS table can be a problem when the high frequency oscillator 108 is disabled as a clock is required to pull the CIS data out of the cards memory 104. To overcome this problem, the bus clock 116 can be specified as the MAC 102 clock source when necessary.

The Mini PCI and Cardbus specifications contain a mechanism that allows an opportunistic disabling of the PCI clock 116. When it is active, the PCI clock 116 forces all devices on the bus segment to clock and use power. The PCI CLKRUN# mechanism allows a device to indicate to the bus that it will allow the clock to be disabled.

A PCI based computer system supports power states for the various cads. These are intended to allow systems to save power by managing the mode and power state that the various functions are operating at. The present invention may be used in cooperation with these different power states. This is especially true if the system has the enabled ability to receive a wakeup event back to the host system for the generation of PME# events or STSCHG# events which are used to wake up the host system.

Figure 2:
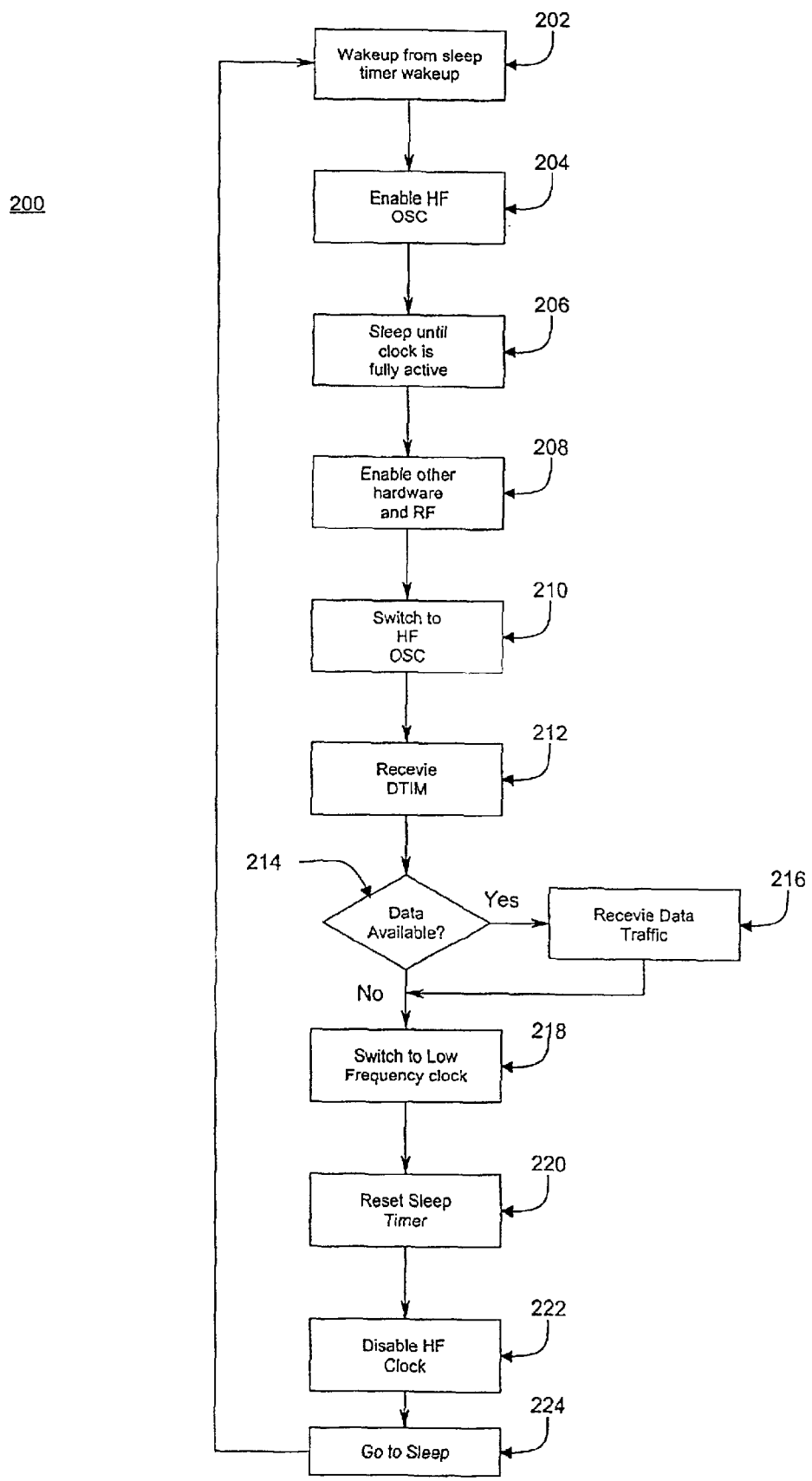
FIG. 2 is a flow chart describing a process for implementing the present invention.

Referring now to FIG. 2, there is shown the steps of a typical sleep/wake cycle 200. Beginning at step 202, the MAC begins to wake up from sleep mode. The MAC using enable line 120 causes the high frequency oscillator 108 to power on. At step 208 the MAC 102 remains in sleep mode until the high frequency oscillator 108 s fully operational, which is typically about 20 ms. This additional wakeup delay can be eliminated if the crystal oscillator is designed such that it has very little or no startup time. At step 208 the MAC 102 then enables other hardware and the RF (or other wireless) interface. At step 210 the MAC 102 switches to the high frequency oscillator 108 by sending a signal on clock select line 107 to the clock multiplexer 106. This clock multiplexer must be implemented such that it does not present any clock glitches or runt pulse to the MAC controller that would impair the correct operation this component. The MAC 102 then waits for a DTIM beacon as shown in step 212 which is received by the RF or wireless interface. At step 214, the MAC 102 determines from the DTIM beacon if there is any activity that needs to be handled. If so, then at step 216 the MAC 102 handles receives the data traffic. At step 216 the MAC 102 begins switching to sleep mode by switching to the low frequency oscillator 110. This is done by sending a signal on clock select line 107 to the clock multiplexer 106. At step 220 the MAC 102 resets the sleep timer (not shown). At step 222, the MAC 102 sends a signal via enable line 120 to disable the high frequency oscillator 108. Then the MAC 102 finally enters sleep mode as shown in step 224.

Figure 3:
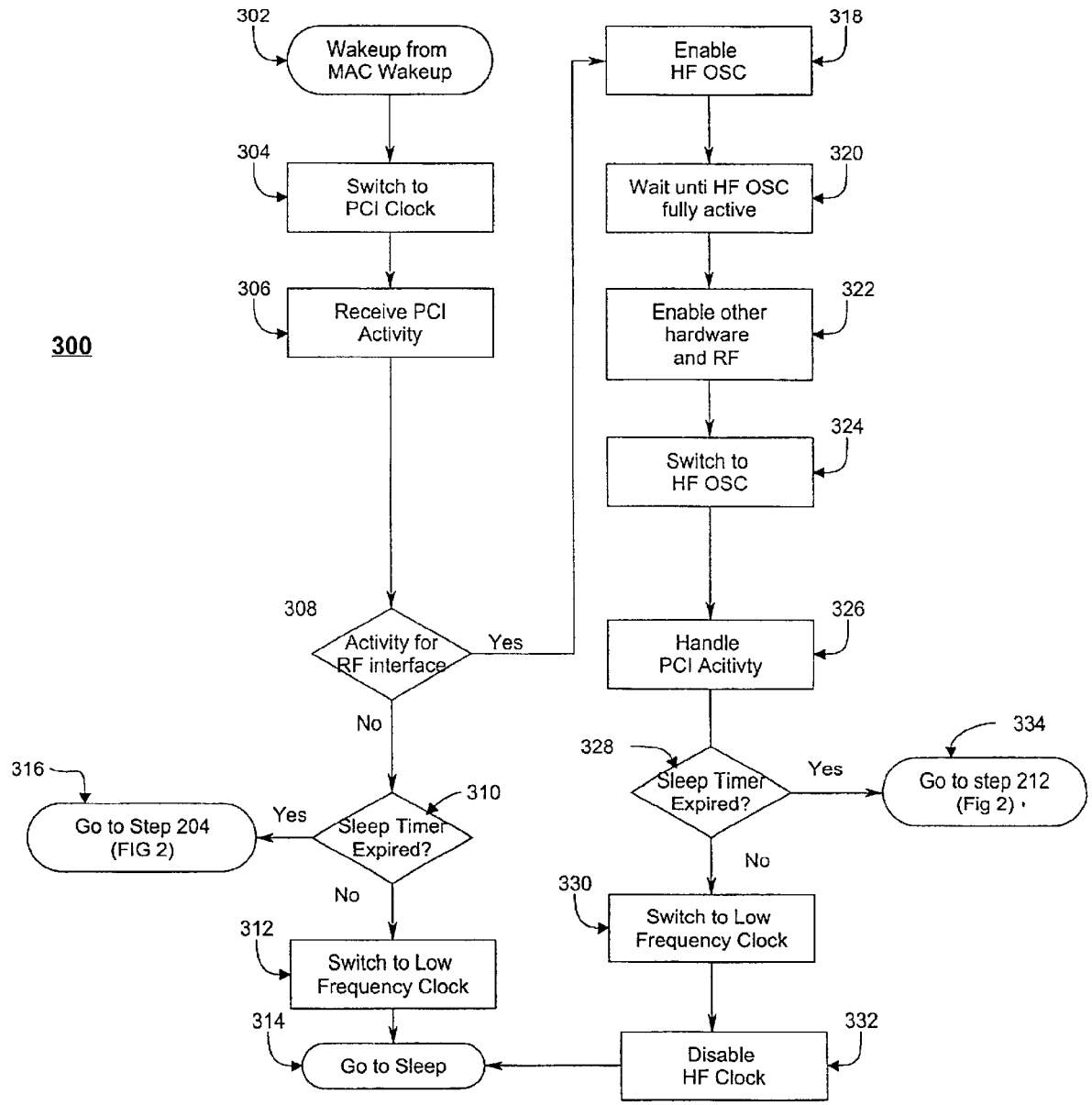
FIG. 3 is a flow chart describing the process utilized by the present invention when the PCI bus has activity while the controller is in sleep mode.

While the MAC 102 is asleep, it must be able to detect and respond to traffic from the bus. This happens automatically, via interrupt when the PCI interface is accessed. FIG. 3 is a block diagram showing the steps involved, generally designated 300. First, as shown in step 302 the MAC receives a signal on the MAC Wakeup line 118 from the bus interface 112. This causes the MAC 102 to send a signal on the clock select line 107 to the clock multiplexer 106 to switch the clocking signal to the PCI clock 116. The clock multiplexer then selects the PCI clock 116 as shown in step 304. The MAC 102 then receives the traffic from the bus 114. At step 308 the MAC 102 determines if the traffic received on the bus requires has activity for the RF or wireless interface (not shown).

If at step 308 there is no activity for the wireless or RF interface, the MAC 102 checks to ascertain whether the sleep timer has expired as shown in step 310. If at step 310 the MAC 102 determines the sleep timer expired, or that the time left on the sleep timer is less then the required time to wake up the hardware, then it goes to step 204 (FIG. 2) and begins the process of enabling the high frequency oscillator 108 and switching to awake mode as already explained in FIG. 2.

If there is no activity for the RF interface and the sleep timer has not yet expired, the MAC 102 then sends a signal via the clock select line 107 to the clock multiplexer 106 to switch to the low frequency oscillator which is shown in step 312 and goes back to sleep as shown in step 314.

If at step 308 the MAC 102 determines that it must operate in active mode, then the MAC 102 sends a signal on enable line 120 to activate the high frequency oscillator 108 as shown in step 318. This can occur when the bus delivers a packet for transmission. As shown in step 320, the MAC 102 waits until the high frequency oscillator 108 is fully activated, typically 20 ms. At step 324 the MAC 102 sends a signal on the clock select line 107 to the clock multiplexer to switch to the high frequency oscillator 108. The MAC 102 and the wireless or RF interface (not shown) then handle the traffic.

After handling the traffic, the MAC 102 then ascertains whether the sleep timer expired as shown in step 328. If the sleep timer expired, then because the MAC 102 is already operating in active mode it jumps to step 212 of FIG. 2.

If the sleep timer has not yet expired at step 328, then at step 330 the MAC 102 sends a signal via the clock select line 107 to the clock multiplexer 106 to switch to the low frequency oscillator 110. After switching to the low frequency oscillator 110, at step 332 the MAC 102 disables the high frequency oscillator 108 by sending a signal to the high frequency oscillator 108 by sending a signal on enable line 120. Then as shown at step 314, the MAC 102 returns to sleep mode.

In the embodiment of FIG. 3, any traffic or activity on the PCI bus targeted to the MAC destined for the RF or wireless interface causes the MAC to immediately switch to active mode and handle. However, it is also contemplated that there may be situations wherein the MAC may queue the message, return to sleep mode, and then send the message after the sleep timer expires.

Thus, the present invention attempts to minimize power consumption by operating the MAC 102 at the lowest clock speed necessary at any given time and by turning off the high frequency oscillator 108 when not in use.

Although the invention has been shown and described with respect to a certain preferred embodiment, it is obvious that equivalent alterations and modifications will occur to others skilled in the art upon the reading and understanding of this specification. The present invention includes all such equivalent alterations and modifications and is limited only by the scope of the following claims.

What is claimed is:

1. A clock management system, comprising:
   a controller;
   a bus interface, the bus interface further comprising a bus clocking signal and a bus activity signal;
   a plurality of oscillators, each oscillator operating at unique clock speeds; and
   selection means for operatively coupling to the controller one of the group consisting of the plurality of oscillators and the bus clocking signal;
   wherein upon receipt of a bus activity signal the selection means selects the bus clocking signal, otherwise the selection means selects the oscillator with the lowest frequency necessary for the controller to operate.

2. The clock management system of claim 1 wherein the controller operates the selection means.

3. The clock management system of claim 1 wherein each of the plurality of oscillators operates in one of a power off mode and a power on mode, the controller being operatively coupled to each oscillator causing each oscillator to operate in the power on mode only when selected by the selection means.

4. The clock management system of claim 1 further comprising a wireless interface operatively coupled to the controller.

5. The clock management system of claim 4 wherein the controller having a sleep mode, the controller synchronizing the time period for the sleep mode with the wireless interface.

6. A clock management system, comprising:
   a Media Access Controller;
   a high frequency oscillator;
   a low frequency oscillator;
   a bus interface for a bus selected from the group consisting of a PCI bus and Cardbus, the bus interface having a bus clock and a wakeup signal connection;
   selection means for selecting one of the high frequency oscillator, low frequency oscillator, and bus clock to be used for clocking the Media Access Controller;
   wherein the bus interface wakeup signal connection is directly connected to the Media Access Controller, the Media Access Controller controls the selection means, and the Media Access Controller controls the operating mode of the high frequency oscillator.

7. The clock management system of claim 6 wherein the Media Access Controller is 802.11 compliant.

8. The clock management system of claim 6 wherein the high frequency oscillator is turned off when not in use by the Media Access Controller.

9. The clock management system of claim 6 wherein a signal from the bus interface wakeup signal causes the selection means to select the bus clock.

10. The clock management system of claim 6 wherein the Media Access Controller enters into a sleep mode for a predetermined time, wherein the selection means selects the low frequency clock and the high frequency oscillator is turned off during the sleep mode.

11. The clock management system of claim 10 wherein the Media Access Controller causes the high frequency oscillator to begin operation and the selection means to select the high frequency clock upon exiting the sleep mode.

12. The clock management system of claim 11 wherein a signal on the wakeup signal connection causes the Media Access Controller to change from sleep mode to an awake mode prior to the completion of the predetermined time period and the Media Access Controller causes the selection means to select the bus clock.

13. The clock management system of claim 6 wherein the selection means is a multiplexer.

14. A method for managing a clock management system for a controller having a sleep mode, an active mode and a sleep mode timer, comprising the steps of:
   providing a high frequency oscillator, a low frequency oscillator and a controllable selection means for selecting one of the high frequency and low frequency oscillator;
   operating the controller with the low frequency oscillator while in sleep mode;
   enabling the high frequency oscillator upon expiration of the sleep mode timer;
   switching the controller to the frequency oscillator when the high frequency oscillator becomes fully operational;
   switching the controller to active mode;
   processing transactions by the controller;
   switching to the low frequency controller;
   resetting the sleep mode timer;
   disabling the high frequency oscillator; and
   switching to sleep mode.

15. The method for managing a clock management system as in claim 14 further comprising:
   waiting for a DTIM beacon while the controller is in active mode; and
   receiving data traffic.

16. The method for managing a clock management system as in claim 14 further comprising
   providing a bus interface clock signal to the controllable selection means and a bus interface wakeup signal connection to the controller, wherein the controllable selection means selects one of the high frequency oscillator, the low frequency oscillator and the interface clock signal;
   sending a bus interface wakeup signal to the controller;
   commanding the selection means to switch to the interface clock signal; and
   switching the selection means to the interface clock signal.

17. A clock management system, comprising:
   a plurality of clocking means, each clocking means operative at a specific frequency;
   selection means receiving inputs from the plurality of clocking means;
   controller means for selecting one of the plurality of clocking means
   enabling means connected to at least one of the plurality of clocking means
   wherein the controller means operates to cause the selection means to select the clocking with the lowest frequency necessary for the controller means to operate; and
   wherein the enabling means turns off the at least one of the plurality of clocking means when it is not the clocking means selected by the selection means.

18. A controller having a computer readable medium with computer readable instructions stored thereon, the controller receiving a clocking signal from a selection means, the selection means receiving a high frequency clocking signal from a high frequency oscillator, a low frequency signal from a low frequency oscillator, the controller selecting of the high frequency signal, low frequency signal from the selection means, the controller further having enabling means for powering on and powering off the high frequency oscillator, the computer readable instructions comprising:
   computer readable instruction means for setting a timer;
   computer readable instructions for causing the selection means to select the low frequency signal;
   computer readable instruction means for powering off the high frequency oscillator;
   computer readable instructions responsive to the timer for powering on the high frequency oscillator after the timer expires; and
   computer readable instructions for causing the selection means to select the high frequency clock signal after the high frequency oscillator achieves normal operating condition.

19. A controller as in claim 18 wherein the selection means further comprises an input from a bus interface having a bus clocking signal wherein the controller selects one of the high frequency signal, low frequency signal and bus clocking signal, the controller further comprising a bus signaling means received from the bus interface, the computer readable instructions further comprising computer readable instructions responsive to the bus signaling means for:
   receiving a wakeup signal from the bus signaling means;
   commanding the selection means to select the bus clocking signal;
   processing an instruction from the bus; and
   commanding the selection means to select the low frequency signal, receiving data from the wireless interface;
   commanding the selection means to select the low frequency signal after receiving data from the wireless interface.

20. The controller as in claim 19 wherein the controller further comprises a wireless interface, further comprising computer readable instructions operative only when the selection means has selected the high frequency signal for:
   waiting for the wireless interface to receive a TIM beacon;
   receiving data from the wireless interface;
   commanding the selection means to select the low frequency signal after receiving data from the wireless interface.

* * * * *